United States Patent
Murdoch

(10) Patent No.: US 11,454,268 B2
(45) Date of Patent: Sep. 27, 2022

(54) COUPLER FOR THREADED REINFORCING BAR

(71) Applicant: Illinois Tool Works Inc., Glenview, IL (US)

(72) Inventor: Thomas Murdoch, Warooka (AU)

(73) Assignee: Illinois Tool Works Inc., Glenview, IL (US)

( * ) Notice: Subject to any disclaimer, the term of this patent is extended or adjusted under 35 U.S.C. 154(b) by 1107 days.

(21) Appl. No.: 16/037,615

(22) Filed: Jul. 17, 2018

(65) Prior Publication Data

US 2019/0024375 A1    Jan. 24, 2019

(30) Foreign Application Priority Data

Jul. 20, 2017 (AU) ............................... 2017902841
Jul. 10, 2018 (AU) ............................... 2018205080

(51) Int. Cl.
*F16B 7/18* (2006.01)
*E04C 5/16* (2006.01)
*F16B 39/30* (2006.01)

(52) U.S. Cl.
CPC .............. *F16B 7/182* (2013.01); *E04C 5/165* (2013.01); *F16B 39/30* (2013.01); *Y10T 403/5733* (2015.01)

(58) Field of Classification Search
CPC .. E04B 2001/5887; E04C 5/165; F16B 7/182; F16B 39/30; Y10T 403/56; Y10T 403/5733; Y10T 403/5746

(Continued)

(56) References Cited

U.S. PATENT DOCUMENTS 3,551,999 A * 1/1971 Gutmann ............... B21D 39/04
                                                            403/300
4,586,861 A * 5/1986 McKewan ............. F16B 39/30
                                                            411/311

(Continued)

FOREIGN PATENT DOCUMENTS

DE          9218785 U1 * 7/1995 .............. F16B 7/182
DE     102005010503 B3 * 6/2006 .............. F16B 7/182

OTHER PUBLICATIONS

Reinforcing Solutions, Reidbar™ Design Guide, 2015 Edition of ITW Construction Systems Australia Pty. Ltd. (40 pages).

(Continued)

*Primary Examiner* — Josh Skroupa
(74) *Attorney, Agent, or Firm* — Neal, Gerber & Eisenberg LLP

(57) ABSTRACT

A coupler for mounting to externally threaded reinforcing bar for use in concrete construction, the comprising a body having a portion with an internal thread for engagement with the thread of the reinforcing bar, wherein the thread form at the inner end portion of the internal thread includes on one of its flanks an enlargement of progressively increasing extension, the enlargement extending towards an opposing flank of the thread to provide an increasing friction fit with the thread of the bar. Various embodiments provide the enlargement being only on a part of the face of the flank whereby the remainder of the face of the flank forms, in conjunction with the adjacent flank of the bar thread during tightening, a void for receiving material displaced during tightening.

20 Claims, 4 Drawing Sheets

Section C-C     Detail E

(58) Field of Classification Search
USPC .......................................... 403/299, 305, 307
See application file for complete search history.

(56) References Cited

U.S. PATENT DOCUMENTS

| | | | | |
|---|---|---|---|---|
| 7,387,319 | B2* | 6/2008 | Papousek | F16L 15/008 |
| | | | | 285/333 |
| 7,416,374 | B2* | 8/2008 | Breihan | E21B 17/042 |
| | | | | 285/334 |
| 7,455,329 | B2* | 11/2008 | Muradov | E21B 17/042 |
| | | | | 285/333 |
| 7,722,304 | B2* | 5/2010 | Pritchard | F16B 39/30 |
| | | | | 411/312 |
| 8,668,232 | B2* | 3/2014 | Mazzaferro | B23G 1/02 |
| | | | | 285/333 |
| 9,494,182 | B2* | 11/2016 | Matsubayashi | F16B 39/30 |
| 9,945,412 | B2* | 4/2018 | Huo | F16B 39/30 |
| 10,281,041 | B2* | 5/2019 | Lochmann | F16B 7/182 |
| 11,067,205 | B2* | 7/2021 | Iwamoto | F16L 15/04 |

OTHER PUBLICATIONS

Genuine ReidBar™ Reinforcing and Connection Systems Product Guide, available prior to Jul. 20, 2017 (9 pages).

* cited by examiner

Section A-A

Section C-C

Detail B

Detail D

Detail E

Section F-F

COUPLER FOR THREADED REINFORCING BAR

PRIORITY

This patent application claims priority to and the benefit of Australian Patent Application No. 2018205080, which was filed on Jul. 10, 2018, and claims priority to and the benefit of Australian Patent Application No. 2017902841, which was filed on Jul. 20, 2017, the entire contents of each of which are incorporated herein by reference.

FIELD

The present disclosure relates to a coupler for threaded reinforcing bar as may be used in concrete construction.

BACKGROUND

One form of reinforcing bar used in concrete construction incorporates a continuous coarse external thread. The thread not only acts to form a key between the reinforcing bar and concrete, it also enables a range of supplementary fittings easily to be applied to the reinforcing bar by engagement of a mating thread with that of the reinforcing bar. One such threaded reinforcing bar is marketed under the trade mark "ReidBar" by the ramsetreid division of ITW Australia Pty Ltd, a related entity of the present applicant. As previously mentioned, the thread on the reinforcing bar is quite coarse and its pitch ranges from 8 mm for a bar of 12 mm diameter to around 16.5 mm for a reinforcing bar diameter of 32 mm.

Internally threaded fittings for mounting over the end of threaded reinforcing bar, for example, for coupling lengths of reinforcing bar in series tend, principally for cost considerations, to be of cast construction, cast iron predominantly, with the internal thread being formed during casting by a sand core. The internal thread formed in this way is not formed to the degree of accuracy which would be expected from a conventionally tapped thread and, moreover, the external thread on the reinforcing bar itself is not formed to a particularly high degree of accuracy. A consequence of this is that there may not be a particularly tight engagement between the fitting and the reinforcing bar and some slippage can occur between the reinforcing bar and the fitting.

Slippage of a coupler on a threaded reinforcing bar can have serious consequences, and certain relevant construction standards require that slip be limited to 0.1 mm under a loading of 450 mPa using a 500 grade reinforcing bar, which can be difficult to achieve as the coarse thread of the reinforcing bar is typically formed to a tolerance of 0.5 mm. While slippage can be avoided by filling the interior of the coupler with an epoxy cement or by mounting a lock nut on the reinforcing bar to tighten against the end of the coupler, these measures add to the time and cost of installing the coupler to the bar. Accordingly, it is desirable to provide a coupler that can accommodate the loose tolerances of the reinforcing bar and minimize slip of the coupler along the reinforcing bar to within the required standard.

SUMMARY

According to various embodiments the present disclosure, there is provided a coupler for mounting to externally threaded reinforcing bar for use in concrete construction, the coupler comprising a body having a portion with an internal thread for engagement with the thread of the reinforcing bar, wherein the thread form at the inner end portion of the internal thread includes on one of its flanks an enlargement of progressively increasing extension. The enlargement extends towards the opposing flank of the thread to provide a progressively increasing friction fit with the thread of the reinforcing bar. In various embodiments, the enlargement is only on a part of the face of the flank whereby the remainder of the face of the flank forms, in conjunction with the adjacent flank of the reinforcing bar thread during tightening, a void for receiving material displaced during tightening.

BRIEF DESCRIPTION OF THE FIGURES

Preferred embodiments of the present disclosure will be described, by way of non-limiting example only, with reference to the accompanying drawings in which.

DETAILED DESCRIPTION

Figure 1:
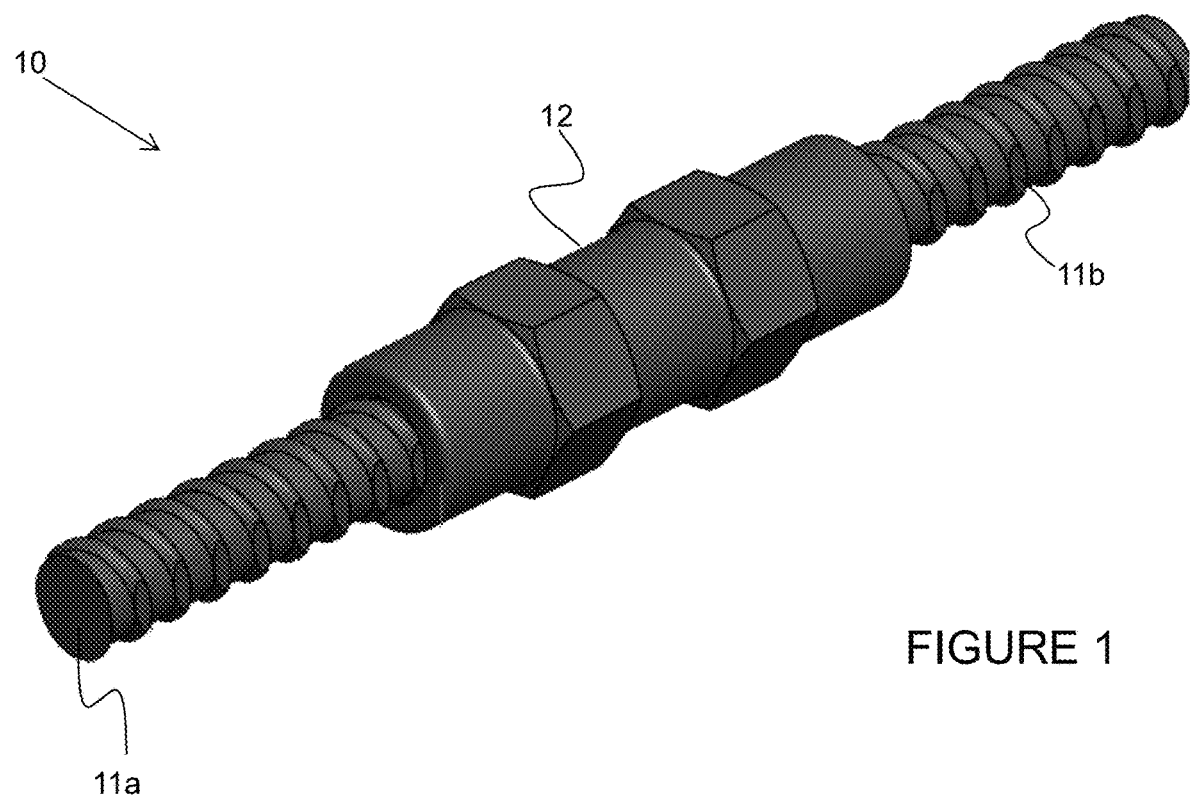
FIG. 1 is a perspective view of a coupler of one example embodiment of the present disclosure, the coupler joining ends of adjacent threaded reinforcing bars.

With reference to FIG. 1, there is shown a coupler 10 according to an example embodiment of the present disclosure. The coupler 10 is configured for joining ends of sections of threaded reinforcing bar 11a, 11b in an end to end relation.

Figure 3:
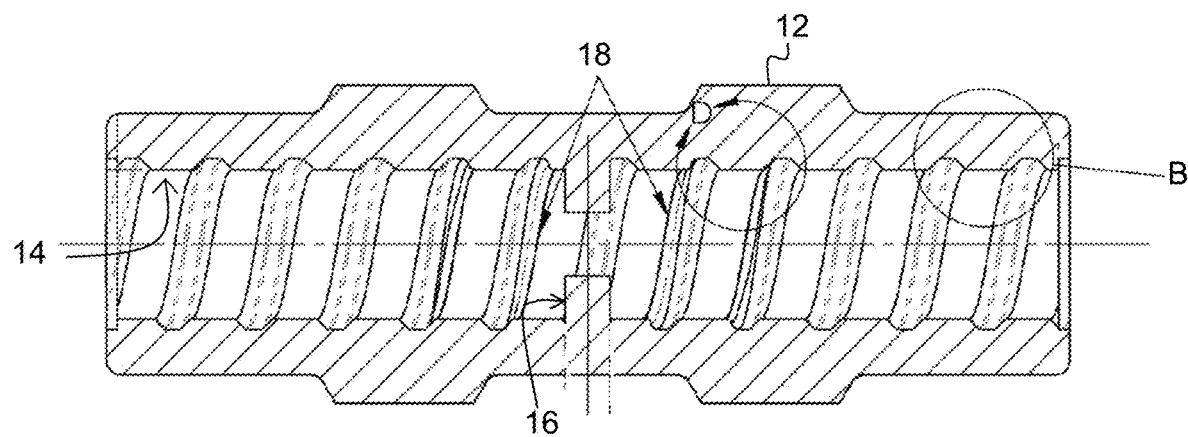
FIG. 3 is a sectional view side view of the coupler of FIG. 1, taken along line A-A of FIG. 2.
Figure 4:
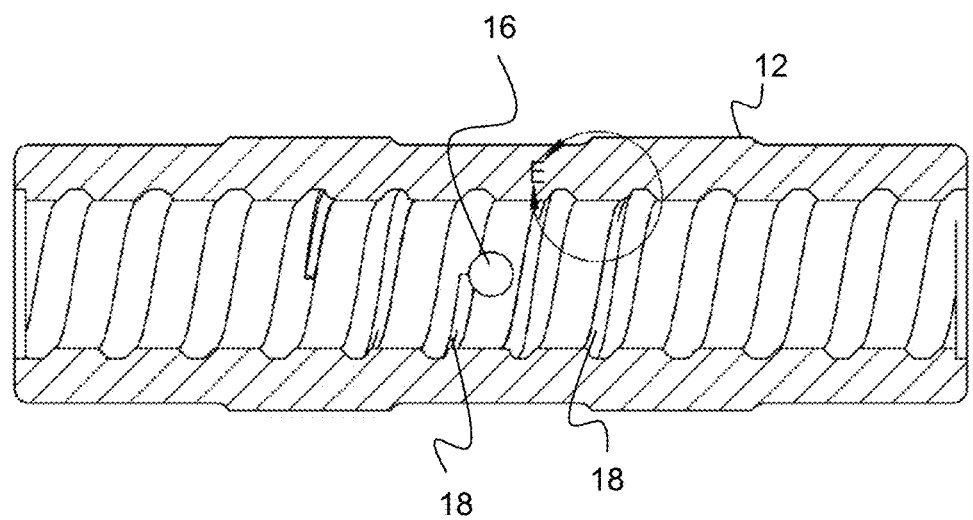
FIG. 4 is a sectional view side view of the coupler of FIG. 1, taken along line C-C of FIG. 6.

The coupler 10 has a body 12 in which ends of adjacent sections of reinforcing bars 11a, 11b can be received. As can be seen in FIG. 3, the body 12 has an internal thread 14 formed therein and an internal stop or stand 16 against which ends of the adjacent sections of the reinforcing bars 11a, 11b can respectively abut. The internal stand 16 may be circumferential and extend the entire circumference of the body 12; though in other embodiments, it may only extend partially within the body 12 and be in the form of a localised boss or extension extending inwardly from the body 12. Externally, the coupler 10 is formed with hexagonal or other formations to permit gripping by a suitable tool such as a spanner or wrench. The coupler is formed by casting, for example from cast iron, with the internal threads being formed by casting using a disposable sand core. To this extent, the coupler is substantially conventional.

Turns of the internal thread 14 adjacent the stand 16 are formed on their inner flank (i.e., the flank closer to the stand 16) with a protuberance or enlargement 18 in the part of that flank adjacent the crest of the thread so as to reduce the thread width in the part adjacent the crest. In various embodiments, the protuberance 18 will only be present within the final 1 to 2 thread turns adjacent the stand 16 and will progressively increase in thickness from zero to a maximum adjacent the stand 16 whereby the width of the internal thread 14 will progressively reduce in the zone of the crest, in the final turn(s) adjacent the stand 16. Due to the progressively reducing thread width in that zone, as the reinforcing bar is advanced toward the stand 16, frictional engagement between the coupler 10 and the bar is increased to lock the coupler 10 onto the reinforcing bar.

Figure 7:
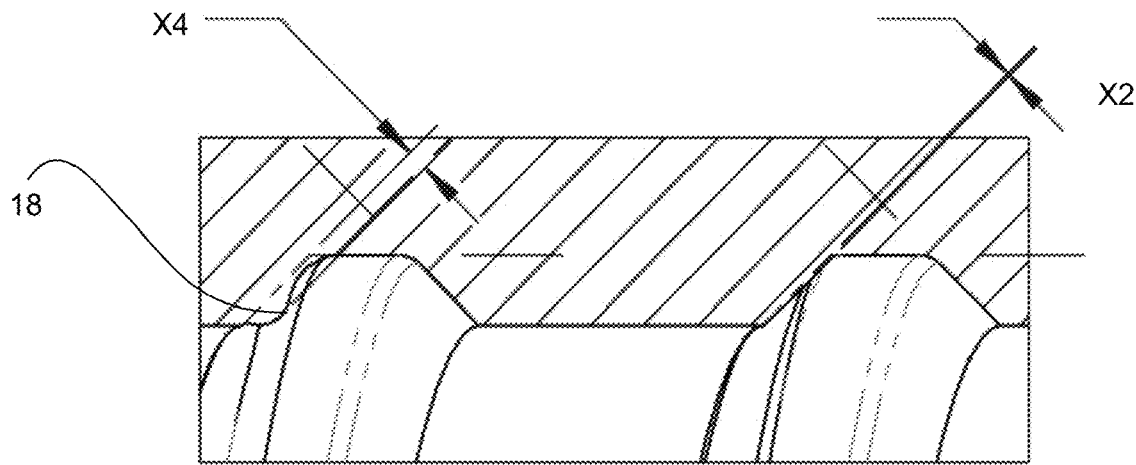
FIG. 7 is an enlarged view of detail D as indicated in FIG. 3.
Figure 8:
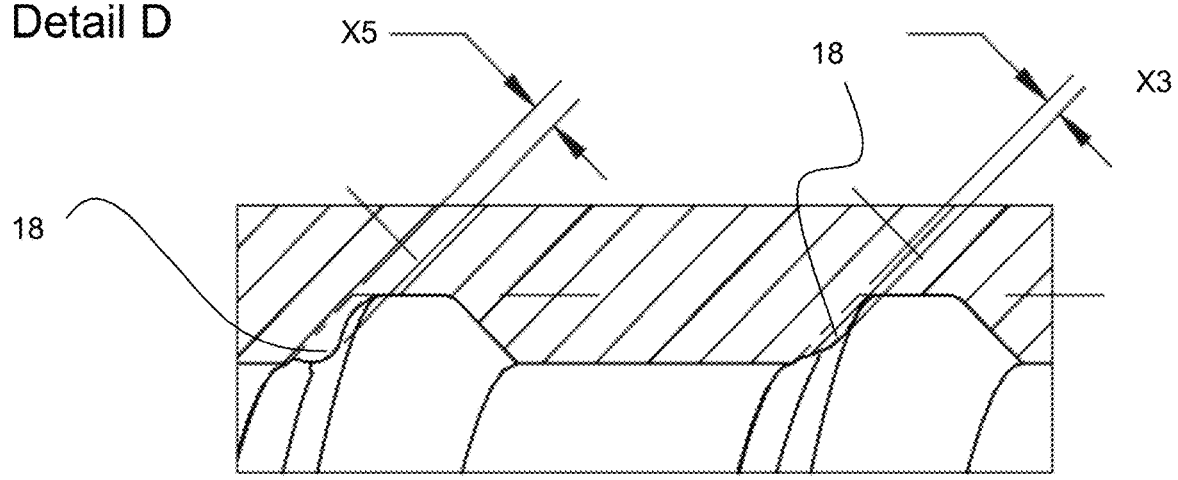
FIG. 8 is an enlarged view of detail E as indicated in FIG. 4.

As can be seen in greater detail in FIGS. 7 and 8, the protuberance 18 is of curved or bulbous form but could be of other shape. It should be noted that the portion of the thread flank inwardly of the protuberance (i.e., the portion of the flank adjacent the thread root) is inwardly displaced relative to the protuberance as considered in its thickness direction whereby when the reinforcing bar is engaged in that portion of the internal thread 14 a void will exist between the portion of the thread flank inwardly of the protuberance and the facing portion of the thread of the reinforcing bar. As a consequence, in the final stages of engagement between the bar and coupler 10 some flow of material can occur from the protuberance into the void. Accordingly, while the frictional engagement engendered between the inner flank of the thread of the reinforcing bar and the protuberance of the facing inner flank on the inner thread 14 of the coupler 10 will prevent slippage or at least minimize slippage to within the required standard, the frictional engagement will not necessitate the need for a high tightening torque. More specifically, the contact between the inner flank of the reinforcing bar thread and the adjacent part of the inner thread 14 of the coupler 10 as defined by the protuberance will be more like a line contact rather than a face contact which would arise if the frictional engagement were to occur over the entire height of the two thread flanks and which would likely require a powered wrench to achieve the required tightness.

In the illustrated embodiment, the protuberance 18 extends for two revolutions of the internal thread 14 and terminates at the stand 16. It will be appreciated that the protuberance 18 may not necessarily extend all of the way to the stand 16 and that it may extend for slightly more than or less than two revolutions.

Although in one form the protuberance is continuous over its angular extent, it may alternatively be interrupted over its angular extent so as to reduce the tightening torque somewhat.

Figure 2:
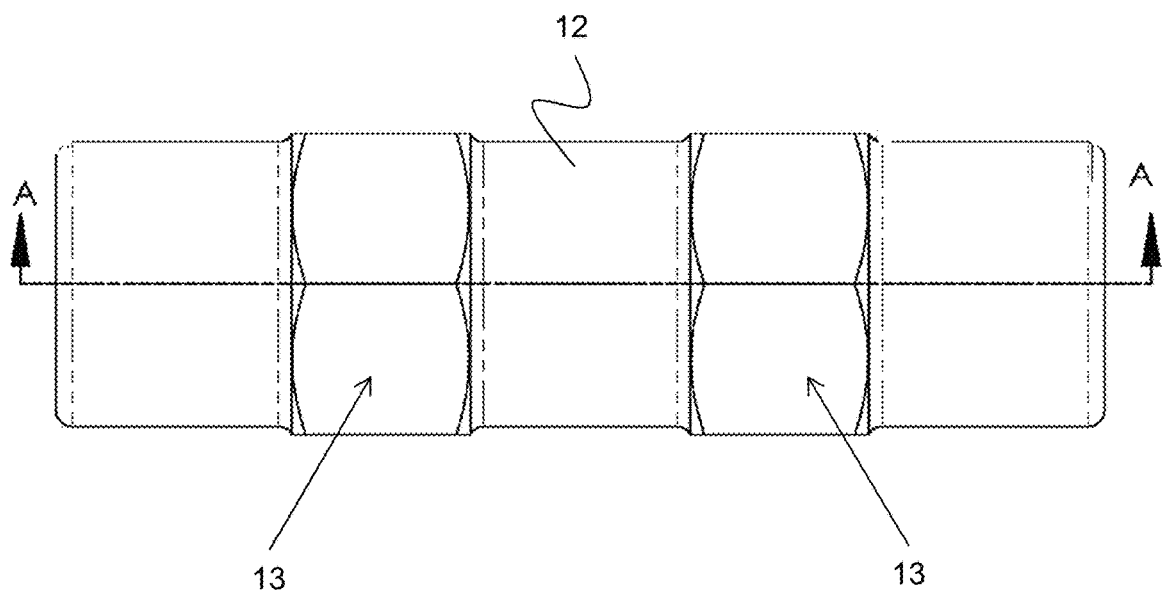
FIG. 2 is a side view of the coupler of FIG. 1.
Figure 6:
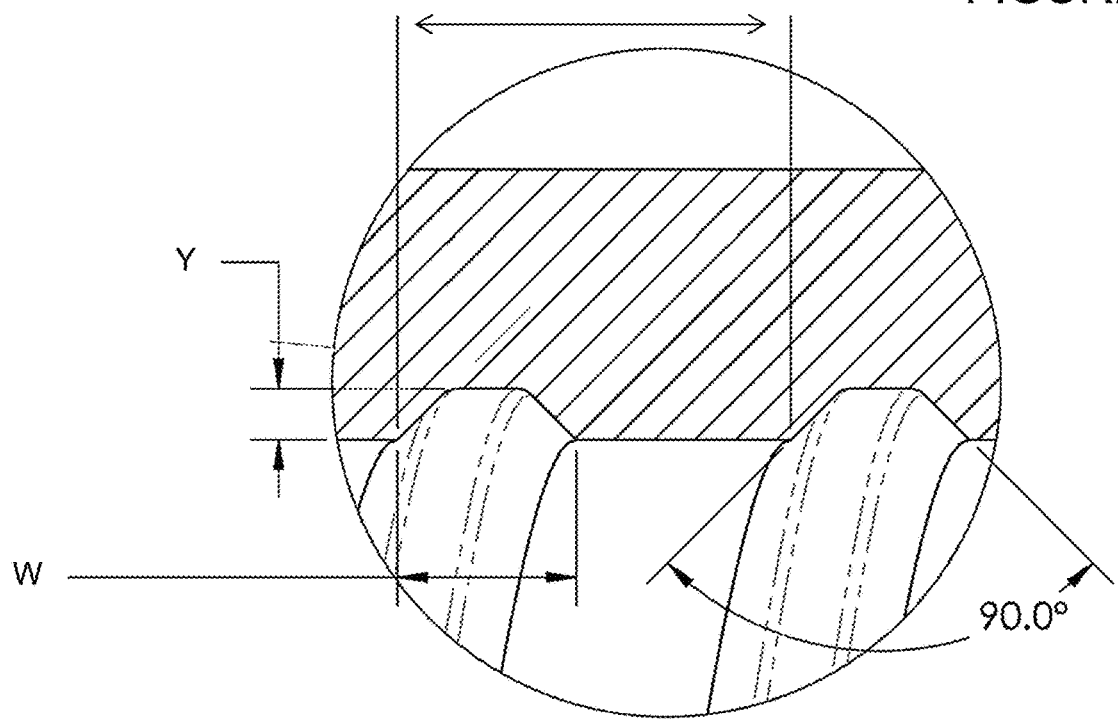
FIG. 6 is an enlarged view of detail B as indicated in FIG. 3.

FIG. 6 illustrates the normal internal thread 14 formed in the body 12. In the illustrated embodiment, the coupler 10 is configured for 20 mm diameter reinforcing bars 11a, 11b and has a major diameter of 22.84 mm and minor diameter of 20 mm. The external diameter of the coupler is 35 mm and has hexagon portions 13 (see FIG. 2) that are 37 mm across the flats (A/F). Returning to the internal thread 14, in the illustrated embodiment, the height of each crest Y is 1.42 mm, the width W is 4.96 mm, the thread pitch P is 10.9 mm and the thread has a thread angle of 90 degrees.

Figure 5:
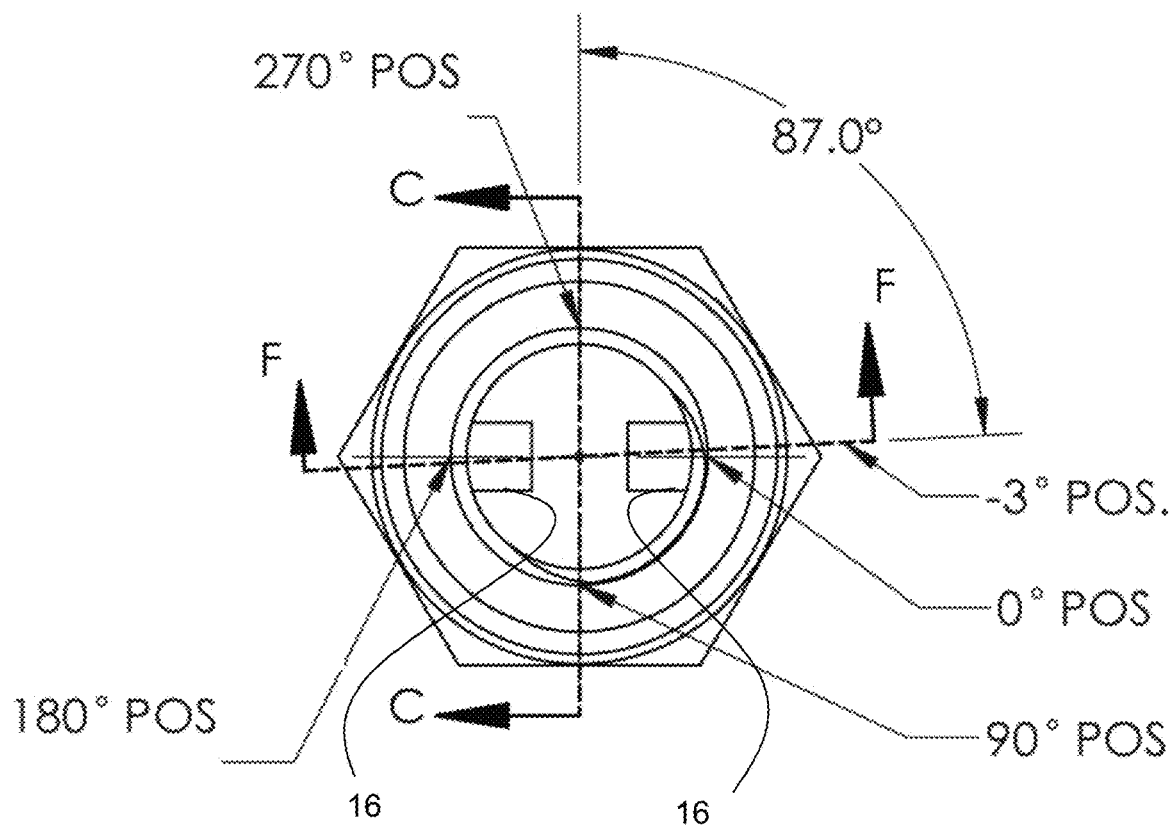
FIG. 5 is an end view of the coupler of FIG. 1.
Figure 9:
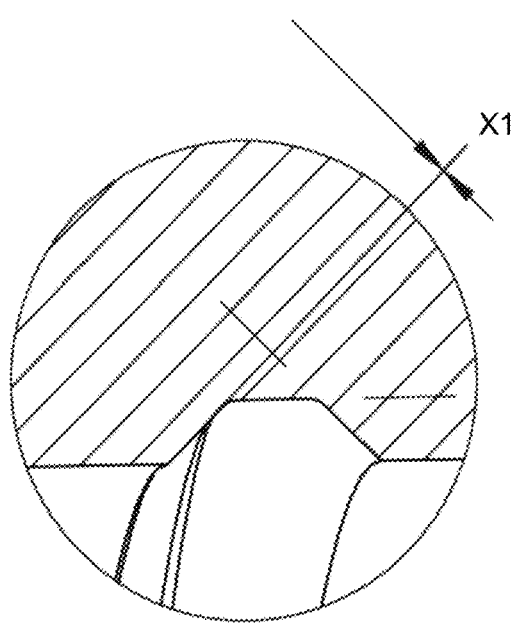
FIG. 9 is an enlarged partial view of section F-F as indicated in FIG. 5.

FIGS. 7 to 9 illustrate the progressively thickening protuberance 18 in more detail, with reference to locations indicated in FIG. 5, the protuberance 18 being indicated by material added to the normal thread.

In this regard, from section F-F of FIG. 9, it can be seen that at the −3 degree location, the increased thickness of the flank X1 is zero. FIG. 7 illustrates the thickness X2 at the zero degree location, which is 0.05 mm. The zero degree location indicates commencement of the protuberance 18.

The thickness X3 of the protuberance 18 at the 90 degree position (FIG. 8) from the commencement increases to 0.37 mm.

The height X4 of the protuberance 18 at the 180 degree location (FIG. 7) from the commencement increases to 0.44 mm.

The height X5 of the protuberance 18 at the 270 degree location (FIG. 8) from the commencement, then increases to 0.55 mm.

Although the present disclosure has been described with reference to a coupler for coupling two lengths of threaded reinforcing bar in end-to-end relation, it will be understood that the present disclosure is applicable to a wide variety of internally threaded couplers for mounting on the end of the bar. By way of non-limiting example, the coupler may alternatively be in the form of a tubular insert internally threaded at one end portion as described above for engagement over the threaded reinforcing bar, and internally threaded at its other end portion with a standard thread for receiving a standard bolt or standard threaded bar, or it may be in the form of a grouter in which the other end portion of the fitting is of hollow construction which permits anchoring therein of the reinforcing bar by way of a cement composition.

It should be appreciated from the above, that in various embodiments, the present disclosure provides a coupler for mounting to an externally threaded reinforcing bar, the coupler comprising: a body having a portion with an internal thread for engagement with threads of the reinforcing bar, wherein an inner end portion of the internal threads include on one of its flanks an enlargement of progressively increasing extension, the enlargement extending towards an opposing flank of the internal threads of inner end portion of the internal threads to provide an increasing friction fit with the threads of the reinforcing bar, the enlargement being only on a part of the face of the flank of the internal threads and wherein a remainder of said face of the flank is configured to form, in conjunction with an adjacent flank of the threads of the reinforcing bar during tightening, a void for receiving material displaced during tightening.

In various such embodiments, the enlargement has a rounded form. In various such embodiments, the enlargement is formed adjacent a crest of the internal threads. In various such embodiments, the enlargement is formed on no more than about two turns of the internal threads.

In various such embodiments, the enlargement is formed adjacent a crest of the internal threads. In various such embodiments, the enlargement is formed on no more than about two turns of the internal threads.

In various such embodiments, the enlargement is formed on no more than about two turns of the internal threads.

It should also be appreciated from the above, that in various embodiments, the present disclosure provides a coupler for coupling two threaded reinforcing bars in end to end relation, the coupler comprising: a body having a portion with two sets of internal threads respectively extending inwardly from opposite ends of the body and separated at their inner ends by an internal stop, wherein each set of internal threads includes an enlargement of progressively increasing size on one of the flanks of said set of internal threads.

In various such embodiments, for each set of internal threads, the enlargement of said set extends towards an opposing flank of the internal threads of said set to provide an increasing friction fit with threads of one of the reinforcing bars, the enlargement being only on a part of the face of the flank of the internal threads of said set, and wherein a remainder of the face of said flank is configured to form, in conjunction with an adjacent flank of the threads of one of the reinforcing bars during tightening, a void for receiving material displaced during tightening.

In various such embodiments, one of the enlargements has a rounded form. In various such embodiments, one of the enlargements is formed adjacent a crest of the internal threads. In various such embodiments, one of the enlargements is formed on no more than about two turns of the internal threads.

In various such embodiments, one of the enlargements is formed adjacent a crest of the internal threads. In various such embodiments, one of the enlargements is formed on no more than about two turns of the internal threads.

In various such embodiments, one of the enlargement is formed on no more than about two turns of the internal threads.

The embodiments have been described by way of example only and modifications are possible within the scope of the present disclosure.

The invention is claimed as follows:

1. A coupler for mounting to an externally threaded reinforcing bar, the coupler comprising:

a body having a portion with internal threads engagable with threads of the reinforcing bar, wherein an inner end portion of the internal threads includes first and second thread turns that include on a same one of their flanks an enlargement of progressively increasing extension from the first thread turn to the second thread turn, the enlargement extending towards opposing flanks of the internal threads of inner end portion of the internal threads to provide an increasing friction fit with the threads of the reinforcing bar, the enlargement being only on parts of faces of the flanks of the first and second thread turns of the internal threads and wherein remainder of said faces of the flanks are configured to form, in conjunction with adjacent flanks of the threads of the reinforcing bar, a void configured to receive material displaced during tightening of the coupler on the reinforcing bar.

2. The coupler of claim 1, wherein the enlargement has a rounded form.

3. The coupler of claim 2, wherein the enlargement is formed adjacent crests of the first and second thread turns.

4. The coupler of claim 3, wherein the enlargement is formed on no more than about the first and second turns of the internal threads.

5. The coupler of claim 1, wherein the enlargement is formed adjacent crests of the first and second turns of the internal threads.

6. The coupler of claim 5, wherein the enlargement is formed on no more than about the first and second turns of the internal threads.

7. The coupler of claim 1, wherein the enlargement is formed on no more than about the first and second turns of the internal threads.

8. A coupler for coupling two threaded reinforcing bars in end to end relation, the coupler comprising:

a body having a portion with two sets of internal threads respectively extending inwardly from opposite ends of the body and separated at their inner ends by an internal stop, wherein each set of internal threads includes an enlargement of progressively increasing size on a same one of the flanks of first and second thread turns of said set of internal threads, wherein the enlargement increases from the first thread turn to the second thread turn.

9. The coupler of claim 8, wherein for each set of internal threads, the enlargement of said set extends towards an opposing flanks of the first and second thread turns of the internal threads of said set to provide an increasing friction fit with threads of one of the reinforcing bars, the enlargement being only on a part of faces of the flanks of the first and second thread turns of the internal threads of said set, and wherein aemainders of the faces of said flanks are configured to form, in conjunction with an adjacent flank of the threads of one of the reinforcing bars, a void configured to receive material displaced during tightening of the coupler on that reinforcing bar.

10. The coupler of claim 8, wherein one of the enlargements has a rounded form.

11. The coupler of claim 10, wherein for one of the sets, the enlargements of said set is formed adjacent crests of the first and second thread turns of the internal threads of said set.

12. The coupler of claim 11, wherein for one of the sets, the enlargements of said set is formed on no more than about the first and second thread turns of the internal threads of said set.

13. The coupler of claim 8, wherein for one of the sets, the enlargements of said set is formed adjacent crests of the first and second thread turns of the internal threads of said set.

14. The coupler of claim 8, wherein for one of the sets, the enlargements of said set is formed on no more than about the first and second thread turns of the internal threads of said set.

15. The coupler of claim 8, wherein for one of the sets, the enlargements of said set is formed on no more than about the first and second thread turns of the internal threads of said set.

16. The coupler of claim 8, wherein each one of the enlargements has a rounded form.

17. The coupler of claim 16, wherein for each of the sets, the enlargement of said set is formed adjacent crests of the first and second thread turns of the internal threads of said set.

18. The coupler of claim 17, wherein for each of the sets, the enlargement of said set is formed on no more than about the first and second thread turns of the internal threads of said set.

19. A coupler for coupling first and second threaded reinforcing bars, the coupler comprising:

a body having a portion with first and second sets of internal threads, the first set of internal threads including a first enlargement of progressively increasing size on a same one of the flanks of first and second thread turns of first internal threads of the first set, the first enlargement extending towards opposing flanks of the first internal threads to provide an increasing friction fit with threads of the first reinforcing bar, the first enlargement being only on parts of faces of the flanks of the first and second thread turns of the first internal threads, and wherein remainders of the faces of said flanks are configured to form, in conjunction with adjacent flanks of the threads of the first reinforcing bar, first voids configured to receive material displaced during tightening of the coupler on the first reinforcing bar, and the second set of internal thread including a second enlargement of progressively increasing size on a same one of the flanks of first and second thread turns of second internal threads of the second set, the second enlargement extending towards opposing flanks of the second internal threads to provide an increasing friction fit with threads of the second reinforcing bar, the second enlargement being only on parts of faces of the flanks of the first and second thread turns of the second internal threads, and wherein remainders of the faces of said flanks are configured to form, in conjunction with adjacent flanks of the threads of the second reinforcing bar, second voids configured to receive material displaced during tightening of the coupler on the second reinforcing bar.

20. The coupler of claim 19, wherein the first and second enlargements each has a rounded form.

\* \* \* \* \*